Figure 1:
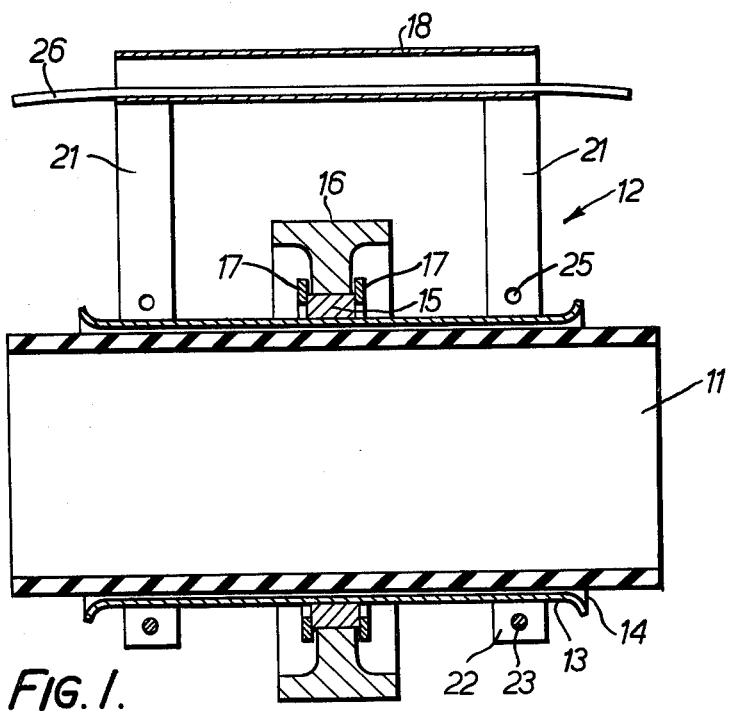

United States Patent [19]

Buckell

[11] 4,085,876
[45] Apr. 25, 1978

[54] HOSE FITTING

[76] Inventor: Raymond Albert Buckell, 41, Belmont Crescent, Maidenhead, Berkshire, England

[21] Appl. No.: 707,538

[22] Filed: Jul. 22, 1976

[30] Foreign Application Priority Data

Jul. 22, 1975 United Kingdom ............... 30624/75

[51] Int. Cl.² .............................................. B65D 71/00
[52] U.S. Cl. ................................... 224/45 R; 137/344; 138/103; 138/178; 214/DIG. 11; 248/75; 254/190 C
[58] Field of Search ........................... 224/45 R, 45 P; 280/79.12; 248/75, 80; 138/178, 103; 137/343, 344; 214/DIG. 11, 1 PA, 1 QC; 285/61, 5, 7; 254/190 C; 308/237 R, 237 A

[56] References Cited

U.S. PATENT DOCUMENTS

| 209,859 | 11/1878 | Callahan | 138/103 X |
| 664,240 | 12/1900 | Doehring | 137/344 |
| 2,174,600 | 10/1939 | Schutmaat | 138/103 X |
| 2,517,208 | 8/1950 | Hunt | 308/237 R X |
| 2,642,318 | 6/1953 | Ricks | 308/237 R X |
| 2,766,996 | 10/1956 | Jacoby | 285/61 X |
| 2,912,996 | 11/1959 | Moulton | 214/1 PA |
| 3,165,286 | 1/1965 | Johnson et al. | 248/75 |
| 3,887,103 | 6/1975 | Spooner | 224/45 R X |
| 3,905,621 | 9/1975 | DeMarco | 285/7 |

FOREIGN PATENT DOCUMENTS

| 746,463 | 3/1956 | United Kingdom | 308/237 R |
| 1,285,383 | 8/1972 | United Kingdom | 137/344 |

Primary Examiner—Drayton E. Hoffman
Assistant Examiner—Donald W. Underwood
Attorney, Agent, or Firm—Oblon, Fisher, Spivak, McClelland & Maier

[57] ABSTRACT

This invention is a hose fitting, a number of which can be applied to a long hose extending over the ground to protect it from damage as it is moved to and fro. Each fitting consists of a sleeve having a wheel mounted to rotate around it, and a carrying handle which is hollow to carry service lines.

5 Claims, 2 Drawing Figures

U.S Patent

April 25, 1978

4,085,876

HOSE FITTING

This invention relates to hose fittings, and one object is to provide a fitting which can be attached to a hose to give the hose some protection as it is dragged over rough ground.

According to the invention a hose fitting comprises a sleeve or collar through which the hose extends, and a wheel carried on the outside of the sleeve or collar.

The wheel is preferably mounted to be capable or rotation on a mounting on the sleeve about the axis of the hose, and is preferably of nylon or another low-friction material enabling it to slide over the ground without excessive damage or resistance.

The sleeve conveniently has bell ends to avoid chafing of the hose at the sleeve edges.

A handle for lifting the hose by use of the fitting can be assembled with the fitting by one or more straps wrapped around the fitting, and conveniently consists of an elongate tube parallel with the hose axis through which air lines, and electrical control leads can be passed.

The invention includes a hose having a number of such fittings spaced along its length so that the hose itself does not easily come into contact with the ground and any rubbing against the ground as the hose is manhandled will be at the wheel and not at the surface of the hose.

Figure 2:
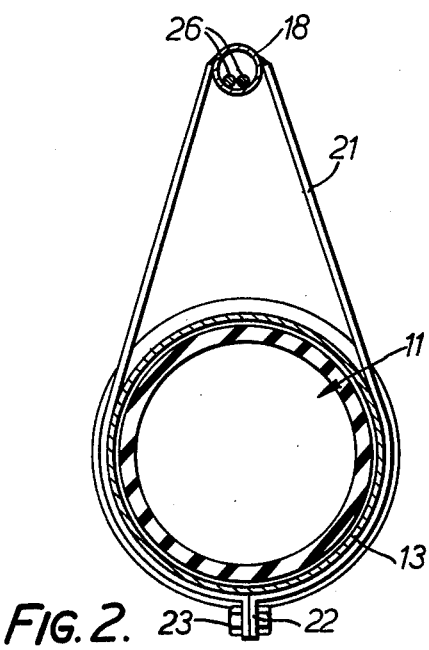

The invention may be carried into practice in various ways and one embodiment will now be described by way of example with reference to the accompanying drawings, of which FIGS. 1 and 2 are respectively a longitudinal section and an end elevation of a hose fitting for a re-fuelling hose for leading from a fuel stand pipe on an airfield to a fuel inlet connection on an aircraft by way of a metering truck.

A 4½ inch diameter flexible hose 11 extends from a connection on a stand pipe to a connection on a metering truck, and has at intervals of 2 or 3 feet along its length protective fittings, one of which is shown at 12.

The fitting consists of a 6½ inch long galvanised steel tube 13 with radiussed ends 14, which is a fairly close fit on the hose. Midway along the tube length an annular ring 15 is welded to the tube, and a moulded nylon wheel 16 can turn on the ring 15. A pair of rings 17 held together on either side of the ring 15 by screws passing through the ring 15 locate the wheel 16 axially and define an annular channel in which it can rotate.

A handle consists of a ¾ inch bore steel tube 18 to each end of which is welded one end of each of a pair of flexible steel straps 21. The free ends of the straps have flanges 22 which can be bolted to the flanges on the corresponding straps by bolts 23 on the side of the pipe 11 remote from the handle. It is possible to bolt the straps together also at the upper side of the tube using holes 25.

The handles 18 are useful for carrying the tube, and can also carry electrical control leads and air lines 26 to keep them clear of the ground.

The fittings tend to prevent damage to the hose while it is being moved into position near an aircraft because the hose can hardly touch the ground, and the nylon wheel makes contact with the ground and that can turn about its axis and slide longitudinally. It will not cause sparks if scraped along the ground and has reasonably low friction and good wear resistance.

With spacing between adjacent fittings as described above, the fittings prevent kinking of the hose.

Of course if the fitting is to be applied to a hose whose ends are not accessible so that the sleeve, rings and wheel cannot be passed over an end, then the sleeve, rings and wheel may each be split into two halves and then assembled around the hose.

In this embodiment the sleeve 13 is split in half along its length and the two halves bolted together through flanges welded to each. If the split is vertical, then flanges need only be welded to the bottoms of the two halves while the tops of the two halves are connected via bolts through the holes 25 in the straps 21. In this embodiment the straps 21 need to be attached to the sleeve only at the top and need not surround the sleeve.

The two halves of the ring 15 are located by means of two dowels in four corresponding slots in the split-faces of the ring. The outer rings 17 are split similarly and bolted to the ring 15 but with their line of split at an angle of 90° to that of the ring 15.

The wheel 16 is split in a similar way to the ring 15 and the two halves connected by means of plates similar to the rings 17, again with the lines of split at an angle of 90° to one another.

What I claim as my invention and desire to secure by Letters Patent is:

1. A hose fitting comprising a sleeve through which a hose extends, a wheel mounted to rotate around the sleeve about the axis of the sleeve, and a handle attached to the sleeve and including a hollow tube parallel with and displaced from the sleeve axis, and supply lines which extend through the hollow tube.

2. A fitting as claimed in claim 1 in which the wheel is made of a low friction material.

3. A fitting as claimed in claim 1 in which the sleeve has outwardly belled ends to avoid chafing of said hose.

4. A fitting as claimed in claim 1 including an annular ring connected to said sleeve to thereby define an annular channel within which said wheel rotates.

5. A fitting as claimed in claim 4, wherein said annular ring is connected to said sleeve midway along the length of said sleeve.

* * * * *